J. IRWIN.
HAT PIN.
APPLICATION FILED MAR. 30, 1910.
967,924.
Patented Aug. 23, 1910.
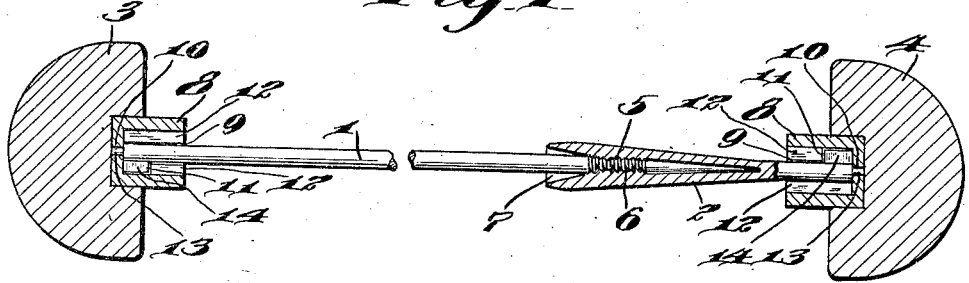
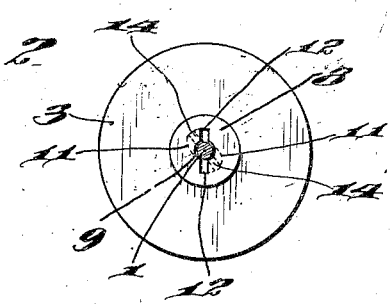
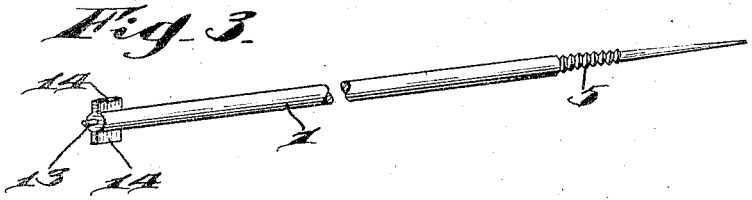
Witnesses
Inventor
John Irwin,
By Joshua R. H. Potts.
Attorney

UNITED STATES PATENT OFFICE.

JOHN IRWIN, OF PHILADELPHIA, PENNSYLVANIA.

HAT-PIN.

967,924.    Specification of Letters Patent.    Patented Aug. 23, 1910.

Application filed March 30, 1910. Serial No. 552,443.

*To all whom it may concern:*

Be it known that I, JOHN IRWIN, a citizen of the United States, residing at Philadelphia, in the county of Philadelphia and State of Pennsylvania, have invented certain new and useful Improvements in Hat-Pins, of which the following is a specification.

My invention relates to improvements in hat pins, and more particularly to improved means for removably attaching the pin head to the pin proper, and the head to a pin guard. In other words, improved pin head fastening means, either for the pin or for the guard, or for both.

A further object is to provide an improved fastening device, which enables the same pin and guard, to be used with a number of different heads, so that the pin heads may be changed to suit the hats or the occasion.

With these and other objects in view, the invention consists in certain novel features of construction and combinations and arrangements of parts, as will be more fully hereinafter described and pointed out in the claims.

In the accompanying drawings: Figure 1, is a broken view in longitudinal section illustrating my improvements. Fig. 2, is a view in end elevation of a pin head. Fig. 3, is a broken perspective view of the pin, and Fig. 4, is a perspective view of the guard.

1, represents the pin, 2 the guard, 3 the head of the pin, and 4 the head of the guard, which is precisely like the head of the pin, and while I have shown these heads 3, and 4, of a simple form, it is to be understood that they may be of any desired material, ornamented in any way to suit the tastes of the trade.

The guard 2 is of general conical form to receive the pin therein, and the pin is provided with screw threads 5, adapted to engage internal screw threads 6, in guard 2. The entrance end of the guard 2 is tapering or beveled, as shown at 7, to guide the point of the pin 1, past the screw threads 6, so that the point will not be liable to catch in the threads when the pin enters the guard.

In the heads 3 and 4, shanks 8 are secured and are provided with cylindrical bores 9, extending to a point near the inner end of the shank, and in the extreme end of the shank an opening 10 is provided of less diameter than the bore 9.

Near the inner end of each shank 8, and communicating with the bore 9, are transverse recesses 11, having curved outer walls forming cam faces, and extending longitudinally of each shank, and at opposite sides of the bore 9, longitudinal grooves 12 are provided, which register with the recesses 11, in the inner portions of shanks 8.

Pin 1, and guard 2, are each provided at their ends with studs 13, smaller in diameter than the pin and guard respectively, and adapted to enter the openings 10 in shanks 8. The pin 1, and the guard 2 are also provided at their ends, adjacent the studs 13, with oppositely projecting tongues 14, which are adapted to enter the longitudinal grooves 12 in the shanks 8, and be forced back in the shanks as the pin or guard is moved through the bore 9 of the shank. When these tongues 14, reach the inner end of the shank, they will lie in the recesses 11, so that when one part is held and the other turned, the tongues will be moved into the recesses, and the cam walls of said recesses will bind against said tongues, and securely hold them in the shank. To release the pin or guard from its head, it is simply necessary to turn one part while the other is held, so that the tongues 14 may be returned to position in line with the grooves 12, when the parts may be readily separated.

By reason of a construction of this character, the owner of a pin and guard may have a large number of different styles of heads, which may be attached and detached from the pin and guard, as desired, and when in use, the guard will securely hold the pin in the hat, will prevent injury from the point of the pin, and the two ornamental heads at the ends of the pin will be alike, and will add to the ornamental and attractive appearance of the hat.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In combination, a head, a shank secured in the head, and having a tubular bore, longitudinal grooves communicating with the bore, and transverse recesses at the inner end of the bore having cam walls, of a member constructed to enter the bore of the shank, and tongues on said member movable through said longitudinal grooves, and into said transverse recesses whereby the tongues will be wedged in the recesses, substantially as described.

2. In combination, a head, a shank secured therein, having a tubular bore, an opening in the inner end of the shank registering with the bore and smaller than the bore, longitudinal grooves at opposite sides of the bore, and transverse recesses in the shank registering with the bore and having outer cam walls, of a member constructed to fit within the bore, a stud on the end of said member to enter said opening in the shank, and tongues at opposite sides of said member adapted to be moved through said longitudinal grooves and into said transverse recesses, substantially as described.

In testimony whereof I have signed my name to this specification in the presence of two subscribing witnesses.

JOHN IRWIN.

Witnesses:
R. H. KRENKEL,
C. E. POTTS.